United States Patent
Nelson et al.

(10) Patent No.: US 7,284,350 B2
(45) Date of Patent: *Oct. 23, 2007

(54) LIGHT TRAP FOR INSECTS

(75) Inventors: Thomas D. Nelson, Maplewood, MN (US); Paul A. Pilosi, Minnetonka, MN (US); Martijn F. Loerakker, Minneapolis, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/510,322

(22) Filed: Aug. 25, 2006

(65) Prior Publication Data

US 2007/0011941 A1    Jan. 18, 2007

Related U.S. Application Data

(63) Continuation of application No. 10/270,095, filed on Oct. 11, 2002, now Pat. No. 7,096,621.

(51) Int. Cl.
    *A01M 1/04* (2006.01)
(52) U.S. Cl. .......................................... 43/113; 43/114
(58) Field of Classification Search .................. 43/107, 43/113, 114
    See application file for complete search history.

(56) References Cited

U.S. PATENT DOCUMENTS

| 944,882 A | 12/1909 | Laube et al. |
|---|---|---|
| 970,784 A | 9/1910 | Böhm |
| 1,009,580 A | 11/1911 | Robinson |
| 1,019,410 A | 3/1912 | Baker |
| 1,280,359 A | 10/1918 | Abresch |
| 1,304,397 A | 5/1919 | Snead |
| 1,333,454 A | 3/1920 | Sato |
| 1,607,413 A | 11/1926 | Tillson |
| D77,408 S | 1/1929 | Hall, Jr. |
| 1,732,272 A | 10/1929 | Kurtz |
| D80,735 S | 3/1930 | Lazerson |
| 1,751,130 A | 3/1930 | Cornelius et al. |
| D81,664 S | 7/1930 | Rubins |
| 1,820,813 A | 8/1931 | Loomis |
| D109,522 S | 5/1938 | Perkins |
| D110,451 S | 7/1938 | Arenberg |
| 2,177,846 A | 10/1939 | Swangren |

(Continued)

FOREIGN PATENT DOCUMENTS

CA          656989          1/1963

(Continued)

OTHER PUBLICATIONS

Brochure, "ZAP® Insect-Electrocutor 24-Hour Automatic, Positive, Non-Chemical Flying Insect Control," *Gardner Manufacturing Co.*, 16 pgs. (1972).

(Continued)

*Primary Examiner*—Kurt Rowan
(74) *Attorney, Agent, or Firm*—Merchant & Gould P.C.

(57) ABSTRACT

A flying insect trap is described including a source of insect attractant light, an insect immobilization device, and a housing partially surrounding the source of light. The housing includes a chassis configured to be attached to a mounting surface, an upper housing pivotally attached to the chassis, and a lower housing that is removably attached to the lower portion of the chassis. In an alternative embodiment, the housing of the trap includes a chassis and a lower housing, where the lower housing includes a lip that surrounds a support structure for an insect immobilization device.

18 Claims, 10 Drawing Sheets

U.S. PATENT DOCUMENTS

| | | |
|---|---|---|
| D128,175 S | 7/1941 | Rebechini |
| 2,286,568 A | 6/1942 | Petry |
| 2,384,930 A | 9/1945 | Kendrick |
| D160,809 S | 11/1950 | Schear et al. |
| D162,345 S | 3/1951 | Roney |
| 2,577,436 A | 12/1951 | Smith |
| 2,645,877 A | 7/1953 | Pohlman |
| 2,731,762 A | 1/1956 | Jones |
| 2,786,298 A | 3/1957 | Smith |
| 2,787,083 A | 4/1957 | Jones |
| 2,791,864 A | 5/1957 | Chappell |
| 3,023,539 A | 3/1962 | Emerson, Jr. |
| 3,059,373 A | 10/1962 | Gardner |
| 3,187,458 A | 6/1965 | Densmore |
| 3,305,965 A | 2/1967 | Cornell, III |
| 3,346,988 A | 10/1967 | Pickering |
| 3,348,332 A | 10/1967 | O'Connell et al. |
| 3,465,468 A | 9/1969 | Takamoto |
| 3,491,478 A | 1/1970 | Gilbert |
| 3,513,585 A | 5/1970 | Ross |
| 3,540,145 A | 11/1970 | McEwen |
| D221,893 S | 9/1971 | Peasley |
| 3,653,145 A | 4/1972 | Stout |
| 3,685,198 A | 8/1972 | Smith |
| D225,631 S | 12/1972 | Gilbert |
| 3,768,196 A | 10/1973 | Iannini |
| 3,913,259 A | 10/1975 | Nishimura et al. |
| 3,998,000 A | 12/1976 | Gilbert |
| 4,027,151 A | 5/1977 | Barthel |
| 4,044,494 A | 8/1977 | Grajnert |
| 4,074,457 A | 2/1978 | Sato et al. |
| 4,117,624 A | 10/1978 | Phillips |
| 4,127,961 A | 12/1978 | Phillips |
| 4,141,173 A | 2/1979 | Weimert et al. |
| 4,147,947 A | 4/1979 | Hoeh |
| 4,157,629 A | 6/1979 | Parks |
| D253,606 S | 12/1979 | Yavnieli |
| 4,212,129 A | 7/1980 | Shumate |
| 4,229,779 A | 10/1980 | Bilson et al. |
| 4,332,100 A | 6/1982 | Schneider |
| 4,366,643 A | 1/1983 | Boaz |
| D269,632 S | 7/1983 | Robertson et al. |
| 4,411,093 A | 10/1983 | Stout et al. |
| 4,490,937 A | 1/1985 | Yavnieli |
| 4,490,938 A | 1/1985 | Baker |
| 4,577,434 A | 3/1986 | Davis |
| D286,206 S | 10/1986 | Joosten et al. |
| D288,247 S | 2/1987 | De Lucchi |
| 4,686,789 A | 8/1987 | Williams |
| 4,694,604 A | 9/1987 | Mitchell |
| 4,696,126 A | 9/1987 | Grothaus et al. |
| D292,525 S | 10/1987 | Van Deelen |
| D292,531 S | 10/1987 | Van Deelen |
| 4,700,506 A | 10/1987 | Williams |
| D298,260 S | 10/1988 | Yoshida et al. |
| D298,360 S | 11/1988 | Dacanay et al. |
| D298,661 S | 11/1988 | Gismondi |
| 4,829,702 A | 5/1989 | Silvandersson |
| 4,841,669 A | 6/1989 | Demarest et al. |
| 4,876,822 A | 10/1989 | White |
| 4,918,856 A | 4/1990 | Olive et al. |
| D308,260 S | 5/1990 | Shemitz |
| D309,791 S | 8/1990 | Boccato et al. |
| D309,792 S | 8/1990 | Mangiarotti |
| D309,795 S | 8/1990 | Sahlen |
| D309,972 S | 8/1990 | Chiba |
| 4,949,501 A | 8/1990 | Larkin |
| D311,256 S | 10/1990 | Frattini |
| 4,959,923 A | 10/1990 | Aiello et al. |
| 4,979,329 A | 12/1990 | Olive et al. |
| 4,992,268 A | 2/1991 | Landolt et al. |
| 4,999,754 A | 3/1991 | Gary |
| D316,306 S | 4/1991 | Shemitz |
| D319,320 S | 8/1991 | Wilda |
| 5,044,112 A | 9/1991 | Williams |
| 5,046,280 A | 9/1991 | Foster et al. |
| D320,668 S | 10/1991 | von Kluck |
| D323,906 S | 2/1992 | Miranda et al. |
| 5,090,153 A | 2/1992 | Mullen et al. |
| D324,742 S | 3/1992 | von Kluck |
| D325,954 S | 5/1992 | Lazzeroni, Sr. et al. |
| 5,111,610 A | 5/1992 | Morisset |
| 5,142,815 A | 9/1992 | Birdsong |
| 5,170,583 A | 12/1992 | Coaker et al. |
| D335,912 S | 5/1993 | Brown et al. |
| 5,259,153 A | 11/1993 | Olive et al. |
| 5,278,737 A | 1/1994 | Luce et al. |
| D346,869 S | 5/1994 | Houssian |
| D346,870 S | 5/1994 | Houssian |
| 5,331,760 A | 7/1994 | DuMont |
| 5,365,690 A | 11/1994 | Nelson et al. |
| 5,425,197 A | 6/1995 | Smith |
| 5,505,017 A | 4/1996 | Nelson et al. |
| 5,651,211 A | 7/1997 | Regan et al. |
| 5,657,576 A | 8/1997 | Nicosia |
| 5,713,153 A | 2/1998 | Cook et al. |
| 5,722,199 A | 3/1998 | Demarest |
| 5,974,727 A | 11/1999 | Gilbert |
| D422,334 S | 4/2000 | Engelbrecht |
| 6,108,966 A | 8/2000 | Otomo et al. |
| 6,289,629 B2 | 9/2001 | Greening |
| 6,493,986 B1 | 12/2002 | Nelson et al. |
| 2002/0139040 A1 | 10/2002 | Burrows et al. |
| 2003/0079398 A1 | 5/2003 | Holmes |

FOREIGN PATENT DOCUMENTS

| | | |
|---|---|---|
| CH | 631 324 | 8/1982 |
| DE | 373240 | 4/1923 |
| DE | 35 06 030 A1 | 8/1986 |
| DE | 3506030 A1 | 8/1986 |
| DE | 38 10 065 C1 | 4/1989 |
| DE | 3810065 C1 | 4/1989 |
| DE | 38 40 440 A1 | 10/1989 |
| DE | 38 40 440 C2 | 8/1990 |
| FR | 2 551 322 | 3/1985 |
| JP | 50-35778 | 4/1975 |
| JP | 64-55137 | 3/1989 |
| JP | 2-174627 | 7/1990 |
| JP | 3-250501 | 11/1991 |
| WO | WO82/00567 | 3/1982 |
| WO | WO92/20224 | 11/1992 |

OTHER PUBLICATIONS

"The Fly Terminal™," *Frank Miller & Sons Inc.*, 2 pgs. (1993).

Brochure, "Venus Flylite™," *Atlantic Research & Development, Inc.*, 4 pgs. (1989).

Brochure, "Sanitary, Effective Fly Control for Food Handling and Other Sensitive Areas," *Vector Fly System*, 18 pgs. (publicly known prior to Jan. 4, 1993).

Catalog, "Gilbert®: Insect Light Traps," *Don Gilbert Industries, Inc.*, 32 pgs. (publicly known prior to Jan. 4, 1993).

Brochure, "Acurid Orkin Designer: Decorative Insect Light Trap," *Orkin Acurid*, 2 pgs. (publicly known after 1998 but prior to Oct. 5, 2001).

Brochure, "The Insect Inn IV™ is their fatal attraction.," *Paraclipse, Inc.*, 3 pgs. (1997).

Catalog, "The Complete Home Furnishings Catalog," *Conran*, 2 pgs. (Spring 1989).

Catalog, "Scott 1988 Supplement: Wall Fixtures by Scott®," *Scott*, 2 pgs. (1988).

Advertisement, "Make A Million Little Problems Disappear," *Ecolab Inc.*, 4 pgs. (1996).

Brochure, "The Vector™ Fly System simply works better than other fly control options for food handling areas," *Micro-Glen Equipment Corp.*, 6 pgs. (publicly known prior to Jan. 4, 1993).

Brochure, "WIL-KIL Sheds Light on the Future of Fly Control," *Wil-Kil Pest Control*, 2 pgs, (Date Unknown).

Brochure, "Adhesive Insect Light Traps," *Orkin Acurid*, 1 pg. (publicly known as early as Jan. 1, 1999).

Winona Light Internet Catalog of Wall Scones, www.artemide.com/cgi/page_ds.php?fam & pro & lan=2&lin=4&vet=0, www.lightwayind.com; www.visalighting.com, and www.winoalighting.com, 28 pgs. (known to Applicant as of Mar. 2000).

"Gilbert® Website Central," http://www.gilbertinc.com/, 29 pgs. (known to Applicant as of Aug. 26, 2002).

Gilbert Insect Light Traps product literature, 16 pgs, (Date Unknown).

I-O-C™ Insect-O-Cutor product literature, 8 pgs, (Date Unknown).

Pickens, L. et al., "Design Parameters That Affect the Performance of UV-emitting Traps in Attracting house Flies (Diptera: Muscidae)," *Journal of Economic Entomology*, vol. 79, No. 4, pp. 1003-1009 (Aug. 1986).

Hollingsworth, J. et al., "Effect of Components on Insect Light Trap Performance," *Transactions of the ASAE*, vol. 15, No. 5, 4 pgs. (1971).

Competitive Literature Review, "Electronics, adhesive offer sanitary fly control," *Pest Control*, 1 pg. (Nov. 1992).

Brochure, "Venus Flylite™," 6 pgs. (Jun. 1992).

Brochure, "ZAP® Gardner Insect-Electrocutor Systems, 24-hour Automatic, Positive, Non-Chemical Fly & Insect Control," *Gardner Manufacturing Co.*, Catalog No. 301, 8 pgs. (publicly known prior to Jan. 4, 1993).

Article, "Insect Traps For Use With Electric Radiant Energy Sources," *Source Unknown*, 4 pgs. (publicly known prior to Jan. 4, 1993).

"Stop 'um Silent Insect Containment Unit Zap 'em.," *Gardner Manufacturing Company*, 2 pgs. (1989).

Advertisement, "Stop 'um," *Gardner Manufacturing Co.*, 1 pg. (publicly known prior to Jan. 4, 1993).

Brochure, "Zap Flying Insect Electrocuting Systems," *Gardner Manufacturing Co.*, 6 pgs. (publicly known prior to Jan. 4, 1993).

Catalog, "Insect Light Traps," *Don Gilbert Industries, Inc.*, 16 pgs. (publicly known prior to Jan. 4, 1993).

Advertisement, "The Fly Magnet," *Ecolab®*, 2 pgs. (publicly known prior to Jan. 4, 1993).

"Flying Insects Control: Part 2, A Profit Opportunity" *A supplement to PCT Pest Control Technology Magazine*, 24 pgs., (Jun. 1998).

Advertisement, "WS-75, Adhesive Insect Light Trap," *Gardner Manufacturing*, 2 pgs. (publicly known as early as Jan. 1, 1999).

Advertisement, "Adhesive Insect Light Traps," *Gardner Manufacturing*, 2 pgs. (publicly known as early as Jan. 1, 1999).

"Surface Lighting," *Halo Lighting*, 3 pgs. (1990).

Brochure, "The Orkin Commercial Fly Control System," *Orkin*, 2 pgs. (Jun. 1997).

Various Internet pages of manufacturers who sell Gardner products, 80 pgs. (Jan. 2000).

Advertisement, "Affordable Fly Control, Choose Your Weapon!," *Anderson Environmental Systems*, 1 pg. (publicly known as early as Nov. 1994).

Advertisement, "Insect-O-Cuter®," www.pestcontrolmag.com Magazine, p. 16 (Apr. 2000).

Brochure, "Paraclipse™ Terminator: A Fly's Worst Enemy," *Paraclipse, Inc.*, 6 pgs. (1999).

"IES Lighting Handbook: The Standard Lighting Guide, Sections 6, 10, 15 and 25" *Edited by John E. Kaufman, Published by Illuminating Engineering Society*, Fourth Edition, pp. 6-1-6-20; 10-1-10-30; 15-1-15-26; and 25-1-25-23 (1966).

"IES Lighting Handbook: The Standard Lighting Guide, Section 25" *Edited by John E. Kaufman and Jack F. Christensen, Published by Illuminating Engineering Society*, Fifth Edition, pp. 25-1-25-24 (1972).

"IES Lighting Handbook: Application Volume, Section 19" *Edited by John E. Kaufman and Howard Haynes, Published by Illuminating Engineering Society Of North America*, pp. 19-1-19-40 (1981).

"IES Lighting Handbook: Application Volume, Section 19" *Edited by John E. Kaufman and Jack F. Christensen, Published by Illuminating Engineering Society Of North America*, pp. 19-1-19-41 (1987).

Brochure, "Lunchtime, The Mantis," *Pest West, B&W Sales & Marketing*, 4 pgs. (1998).

Brochure, "Luralite: Attractive Flying Insect Control," *Luralite*, 4 pgs., (1999).

Brochure, "The Insect Inn IV™ is their fatal attraction.," *Paraclipse, Inc.*, 6 pgs. (1999).

"Prescription Treatment Food Safety," *Whitmire Micro-Gen Research Laboratories, Inc.*, 10 pgs. (Aug. 1999).

Flyers, "Fly Control for Restaurants: Adhesive Insect Light Trap Placement Strategies for Food Areas," *Gardner Manufacturing*, 2 pgs. (Jul. 1999).

Manual, "Vector System," *Micro-Gen Equipment Corp.*, pp. 1-9 (Oct. 1991).

Brochure, "No-Zap Flytraps will control your flying insect problem!!! We Guarantee It!!!," *CCI Industries, Inc.*, 4 pgs. (Apr. 1999).

Brochure, "Guardian® Hanging Fly Trap: Glueboard Model GBH362," *Insect-O-Cutor*, 1 pg. (Sep. 1998).

Brown, J., "A revolution in electronic fly traps," *Journal of Environmental Health*, pp. 267 (May/Jun. 1989).

Weidhaas, D. et al., "Insect Electrocuting Light Trap Research, First Edition," *Don Gilbert Industries, Inc.*, pp. 1-96 (Aug. 1988).

Sudjic, D., "The Lighting Book: A Complete Guide To Lighting Your Home," *Crown Publishers, Inc.*, 16 pgs. (1985).

"wil-kil.com: Focusing on Quality IPMI," http://www.wil-kil.com/index1024.html, 7 pgs. (Jun. 7, 2002).

"DecoCatch™ ILT," http://www.wil-kil.com/business/popups/decocatchdetails.html, 1 pg. (Jun. 6, 2002).

Gilbert, D. et al., "Gilbert® Strategic Installation of Professional Flytraps," http://www.gilbertinc.com/strategi.htm, 4 pgs. (Nov. 2002).

*Interior Design Magazine*, 3 pgs. (May 1990).

*Interior Design Magazine*, 2 pgs. (Apr. 1991).

*Interior Design Magazine*, 2 pgs. (Jun. 1991).

*Interior Design Magazine*, 2 pgs. (Jul. 1991).

*Interior Design Magazine*, 3 pgs. (Sep. 1991).

Catalog, "Surface Lighting," *Halo Lighting*, 5 pgs. (1990).

Catalog, "Progress Lighting Ideas," *Progress Lighting*, vol. 120, 5 pgs. (1990).

Catalog, "Halo Surface Lighting," *Halo Lighting*, 7 pgs. (Jan. 1987).

Catalog, "Boyd," *Boyd Lighting Company*, 11 pgs. (1987).

Advertisement, "The Mantis catches the small flies the others leave behind!," *PestWest™ Flying Insect Solutions*, 4 pgs, (Date Unknown).

Brochure, "The Lighted Fly Glue Trap. It's Outta Sight!," *Catchmaster*, 1 pg, (Date Unknown).

Brochure, "Introducing: The Lighted Fly Glue Trap. It's Outta Sight!," *Catchmaster*, 1 pg, (Date Unknown).

Brochure, "FICS: Flying Insect Control System: A Safe, Hygienic Answer To Flying Insects," *Rentokil*, 2 pgs, (Date Unknown).

Shaheen, L., "Light Traps Spark Focus On Prevention," *Pest Control*, 2 pgs. (Date Unknown, between May 1992 and May 1999).

Advertisement, "Flies: Stealth Fly Program," *Ecolab Inc.*, 4 pgs. (2000).

Price List, "Fly Killer Retail Price List," *P & L Systems LLC*, 1 pg. (publicly known after Jan. 4, 1993, but prior to Nov. 21, 1994).

Advertisement, "They're attracted to food. They're attracted to light. They're attracted to other flies. The Insect Inn II™ is their fatal attraction," *Paraclipse, Inc.*, 6 pgs. (1994).

"Selecting A Professional Flytrap," http://gilbertinc.com/gluetrap.htm, 5 pgs. (publicly known as early as Feb. 28, 2000).

Brochure, "See the Light with Ecolab's Latest Weapon for Flying Insect Defense: The Fly Magnet," *Ecolab Inc.*, 2 pgs. (publicly known prior to Jan. 4, 1993).

Brochure, "The Vector Fly System," *Micro-Gen Equipment Corp.*, 10 pgs. (publicly known prior to Jan. 4, 1993).

"Specifications Model 924 Flintrol," *Gilbert Electronics, Inc.*, 1 pg. (publicly known prior to Jan. 4, 1993).

Brochure, "Flying Venus Wall Sconce/Fly Trap," *Gilbert Industries, Inc.*, 6 pgs. (publicly known after Jan. 4, 1993 but prior to Nov. 21, 1994).
Brochure, "Adhesive Insect Light Traps," *Gardner Manufacturing*, 8 pgs. (publicly known as early as Jan. 1, 1999).
Brochure, "Fly Control for Restaurants," *Gardner Manufacturing*, 2 pgs. (publicly known as early as Jan. 1, 1999).
Catalog, "Gardner Insect Light Traps," *Gardner Manufacturing*, 8 pgs. (publicly known as early as Jan. 1, 1999).
Advertisement, "Stop Fly Problems! Get the *Mirage* WS-50 decorative Fly Light," *Gardner Manufacturing*, 11 pgs. (publicly known as early as Nov. 1994).
Catalog, "Gardner Environmental Products: Insect Light Traps," *Gardner Manufacturing*, 8 pgs. (publicly known as early as Nov. 1994).
Advertisement, "WS-50," *Gardner Manufacturing*, 2 pgs. (publicly known as early as Nov. 1994).
Advertisement, "WS-50 Adhesive Insect Light Trap," *Gardner Manufacturing*, 2 pgs. (publicly known as early as Nov. 1994).
"Product Catalog," *Gardner Manufacturing Environmental Products Division*, 8 pgs. (publicly known as early as Nov. 1994).
Brochure, "GT-200, We put fly control in a new light!," *Source Unknown*, 4 pgs. (publicly known as early as Nov. 1994).
"Gardner Environmental Products, Product Catalog," *Gardner Manufacturing*, 8 pgs. (publicly known as early as Nov. 1994).
Advertisement, "Capture Flies in Style, "Diamond V" Wall Sconce/ Insect Light Trap," *Gardner Manufacturing*, 2 pgs. (publicly known as early as Nov. 1998).
"Gardner Insect Control," *Gardner Manufacturing*, http://www.gardnermfg.com/insect/, 20 pgs. (known to Applicant as of May 9, 2002).
Various Web Pages of manufacturers in the industry, 26 pgs. (known to Applicant as of Aug. 26, 2002).
"No Zap Flytraps," http://www.amer-rest-equip.com/cci/cci_zap.html, 2 pgs. (known to Applicant as of Aug. 26, 2002).
B & G Equipment Company, http://bgequip.com/, 5 pgs. (known to Applicant as of Aug. 26, 2002).
Luralite, http://www.bugspray.com/catalog/products/page1442.html, 2 pgs (known to Applicant as of Aug. 26, 2002).
Catchmaster, http://www.catchmaster.com/, 14 pgs. (known to Applicant as of Aug. 26, 2002).
Country Vet, http://www.country-vet.com/indProduct.php4?itemNum=xxxxxxx, 1 pg. (known to Applicant as of Aug. 26, 2002).
"Advantage Traps Flytraps, and interesting Fly Facts," http://www.flyfacts.com/HTML/uses.htm, 4 pgs. (known to Applicant as of Aug. 26, 2002).
Fly Traps, http://www.flytrappers.com/luralite.htm, 2 pgs. (known to Applicant as of Aug. 26, 2002).
"Insectu-O-Cutor Insect Control Products," http://www.germ-o-ray.com/iocpages/iocprods.html, 2 pgs. (known to Applicant as of Aug. 26, 2002).
"Insect Control World-Insect Control and Fly Trap Devices by Restaurant Equipment," http://www.insectcontrolworld.com/, 6 pgs. (known to Applicant as of Aug. 26, 2002).
"Starkeys Products," http://members.iinet.net.au/~starkey/, 12 pgs. (known to Applicant as of Aug. 26, 2002).
"Paraclipse, Inc., Columbus, NE, feature the Insect Inn IV and Terminator automated," 16 pgs. (known to Applicant as of Aug. 26, 2002).
"Advantage Fly Trap," http://www.pestproducts.net/flytrap.htm, 2 pgs. (known to Applicant as of Aug. 26, 2002).
"PestWest-Flying Insect Solutions," http://www.pestwest.com/home.cfm?lang=3, 5 pgs. (known to Applicant as of Aug. 26, 2002).
"Flying Insect: Introducing Aurora 360," http://www.watco.com/aurora2.htm, 5 pgs. (known to Applicant as of Aug. 26, 2002).
Whitemire Micro-Gen Research Laboratories, Inc. Website, http://www.wmmg.com/default.htm, 17 pgs. (known to Applicant as of Aug. 26, 2002).
Gilbert, D. et al., "Strategic Installation of Insect Light Traps," *Gilbert Manufacturing*, pp. 4-19 (publicly known after 1998 but prior to Oct. 5, 2001).

Catalog, "Gilbert Professional Flytraps," *Gilbert Manufacturing*, 21 pgs. (publicly known after 1998 but prior to Oct. 5, 2001).
Brochure, "Illumé, the first name in discreet insect control," *ACtron Incorporated*, 1 pg. (Date Unknown, although *not* publicly known prior to Jan. 5, 1993).
Brochure, "Illumé stylish insect control," *ACtron Incorporated*, 2 pgs. (Date Unknown, although *not* publicly known prior to Jan. 5, 1993).
"B&G's Integrated House Fly Program," *B&G Equipment Company*, pp. 1-33, (Date Unknown, although *not* publicly known prior to Jan. 5, 1993).
"Fly Control Solutions," *B&G Equipment Company*, pp. 1-8 (Date Unknown, although *not* publicly known prior to Jan. 5, 1993).
"Do you recognize this threat to food safety?," *Ecolab Inc.*, 4 pgs. (Date Unknown, although *not* publicly known prior to Jan. 5, 1993).
"Dedicated To Hygiene," *P+L Systems LLC*, 21 pgs. (Date Unknown, although *not* publicly known prior to Jan. 5, 1993).
Brochure, "Meet The Bacteria Brothers," *Paraclipse, Inc.*, 2 pgs. (Date Unknown, although *not* publicly known prior to Jan. 5, 1993).
Photographs of Device GT-100, 1 pg. (publicly known prior to Jan. 4, 1993).
Photographs of The Vector Flying Insect Trap, 3 pgs, (Date Unknown).
Photographs of wall sconces, 4 pgs. (publicly known prior to Jan. 4, 1993).
Photographs of Progress Lighting Model No. P7101-30, 2 pgs, (Date Unknown).
"Progress Lighting Ideas," *Ja-Mar Elec. Supply/Lighting*, 2 pgs, (Date Unknown).
"CB Aurora 360, Illuminated Fly Trap System with Scented Pheromone Attractant," *CB Waterbury Companies, Inc.*, 4 pgs. (1997).
"The Vector Fly Systems," *Whitemire Micr-Gen Research Laboratories, Inc.*, 4 pgs, (Date Unknown).
Photographs of Device: Carol Clamp Light Model #04170.94.MP, A277-894, *TF Carol Cable Company*, 3 pgs, (Date Unknown).
Photographs of HALO Lighting Metro Quarter Sphere Model No. H2572PB, 2 pgs, (Date Unknown).
Photographs of VISA Lighting wall sconce CB 2220, 2 pgs. (publicly known prior to Jan. 4, 1993).
Photographs of VISA Lighting wall sconce CB 3020, 2 pgs. (publicly known prior to Jan. 4, 1993).
Photographs of VISA Lighting wall sconce CB 3024, 2 pgs. (publicly known prior to Jan. 4, 1993).
Photographs of VISA Lighting wall sconce CB 3082, 2 pgs. (publicly known prior to Jan. 4, 1993).
Photographs of VISA Lighting wall sconce CB 2850, 2 pgs. (publicly known prior to Jan. 4, 1993).
Goldsmith, T. et al., "The Sensitivity Of Housefly Photoreceptors In The Mid-Ultraviolet And The Limits Of The Visible Spectrum," *J. Exp. Biol.*, vol. 49, No. 3, pp. 669-677 (Dec. 1968).
Syms, P. et al., "The effect of flickering U-V light output on the attractiveness of an insect electrocutor trap to the house-fly, *Musca domestica*," *Entomol. exp. appl.*, vol. 43, No. 1, pp. 81-85 (Feb. 1987).
Roberts, A. et al., "Intensity and spectral emission as factors affecting the efficacy of an insect electrocutor trap towards the house-fly," *Entomol. exp. appl*, vol. 64, No. 3, pp. 259-268 (Sep. 1992).
Lillie, T. et al., "Operational Testing of Electrocutor Traps for Fly Control in Dining Facilities," *Journal of Economic Entomology*, vol. 80, No. 4, pp. 826-829 (Aug. 1987).
Thimijan, R. et al., "A Method for Predicting House Fly Attraction of Electromagnetic Radiant Energy," *Journal of Economic Entomology*, vol. 66, No. 1, pp. 95-100 (Feb. 15, 1973).
Miall, R., "The flicker fusion frequencies of six laboratory insects, and the response of the compound eye to mains fluorescent 'ripple'," *Physiological Entomology*, vol. 3, No. 2, pp. 99-106 (Jun. 1978).
U.S. Appl. No. 08/629,049, filed Apr. 8, 1996.
U.S. Appl. No. 09/972,456, filed Oct. 5, 2001.
U.S. Appl. No. 10/159,325, filed May 31, 2002.
McGraw-Hill Dictionary of Scientific and Technical Terms, Daniel N. Lapedes Editor in Chief, McGraw-Hill Book Company, 7 pages (1974).

LIGHT TRAP FOR INSECTS

CROSS REFERENCE TO RELATED APPLICATIONS

This application is a continuation of U.S. application Ser. No. 10/270,095 filed Oct. 11, 2002 that issued as U.S. Pat. No. 7,096,621 on Aug. 29, 2006. This application is related to Application Ser. No. 09/604,488, filed Jun. 27, 2000, pending, which is a continuation of Application Ser. No. 09/250,932, filed Feb. 18, 1999, now abandoned, which is a continuation of Application Ser. No. 08/686,432 filed Jul. 26, 1996, now abandoned, which is a continuation in part of application Ser. No. 08/000,264, filed Jan. 4, 1993, now issued as U.S. Pat. No. 5,365,690. U.S. application Ser. No. 10/270,095 and these related applications are hereby incorporated herein by reference in their entirety.

FIELD OF THE INVENTION

The invention relates to an illuminated trap adapted to attract flying insects and immobilize the insects within a trap housing.

BACKGROUND OF THE INVENTION

Flying insect traps exist that use insect-attractant light sources and use an immobilization system to trap the insects within the trap. Often, the immobilization system is an adhesive board or glue board, which needs to be replaced periodically. Improvements to existing traps are desirable to improve the ease with which the immobilization means may be installed and changed. In addition, improvements to the structure of the housing of insect traps could decrease the likelihood that dead insects would fall from the trap while the immobilization device is being replaced.

SUMMARY OF THE INVENTION

A flying insect trap is described including a source of insect attractant light, an insect immobilization device, and a housing partially surrounding the source of insect attractant light and defining an opening for insect attractant light emission and insect entry into the trap. The housing includes a chassis for attaching to a mounting surface, where the chassis supports the source of insect attractant light. The chassis also includes an upper portion and a lower portion. The housing also includes an upper housing pivotally attached to the upper portion of the chassis and movable between a closed position and an open position. The housing also includes a lower housing that is removably attached to the lower portion of the chassis. In addition, the housing includes a support surface for the insect immobilization device.

In another embodiment of the flying insect trap, the housing includes a chassis configured to be attached to a mounting surface, supporting a source of light and an insect immobilization device, and an upper housing. In this embodiment, the chassis includes a lip that surrounds the support structure for the insect immobilization device.

In another embodiment of the flying insect trap, the trap is configured to form an insect attractant light pattern of reflected and radiated light on the mounting surface. The trap may include a second source of insect attractant light that is supported by the chassis. In another embodiment, the lower housing of the trap includes an upper lip that surrounds the support structure for the insect immobilization device.

In one embodiment of the trap, the housing completely encloses the first source of insect attractant light on all sides except on a side where the opening is located. In one embodiment, the opening is an upwardly facing opening when the trap is mounted on a vertical mounting surface.

In another embodiment of the trap, the insect immobilization device includes adhesive. In one embodiment, the insect immobilization device is positioned below the source of insect attractant light. In another embodiment, the insect immobilization device is positioned on a back wall of the chassis, while in a further embodiment, the insect immobilization device is positioned on an interior surface of the upper housing. Any combination of these three locations for an insect immobilization device is contemplated.

BRIEF DESCRIPTION OF THE DRAWINGS

The invention may be more completely understood by considering the detailed description of various embodiments of the invention which follows in connection with the accompanying drawings.

Figure 1:
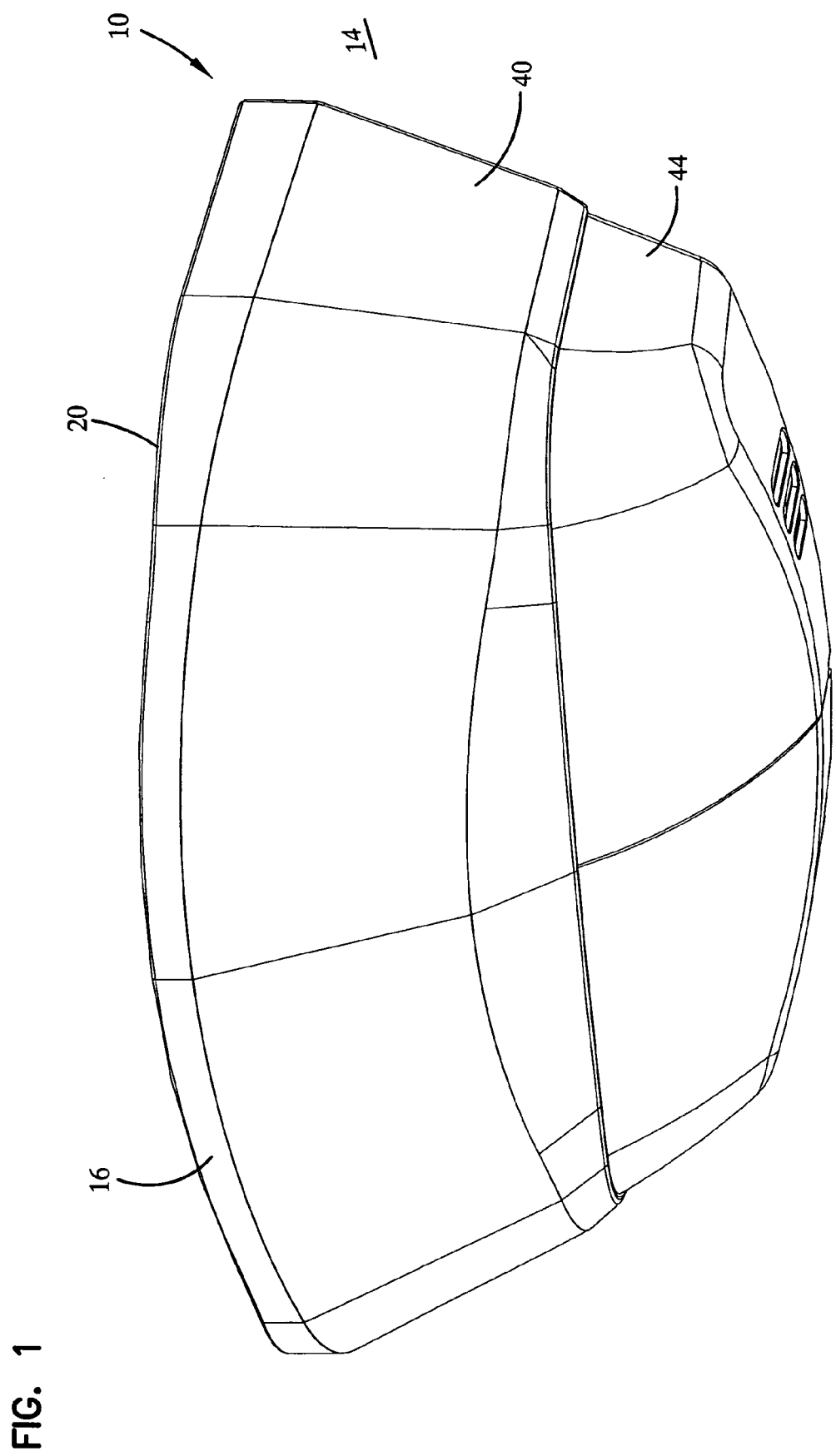
FIG. 1 is a bottom, right, front perspective view of one embodiment of an illuminated flying insect trap of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements for trapping flying insects where light is used as an insect attractant. The invention has been found to be particularly advantageous in application environments where an adhesive structure is used to immobilize the flying insects and where this adhesive structure is replaced routinely. While the invention is not so limited, an appreciation of various aspects of the invention is best gained through a discussion of various application examples operating in such an environment.

Figure 2:
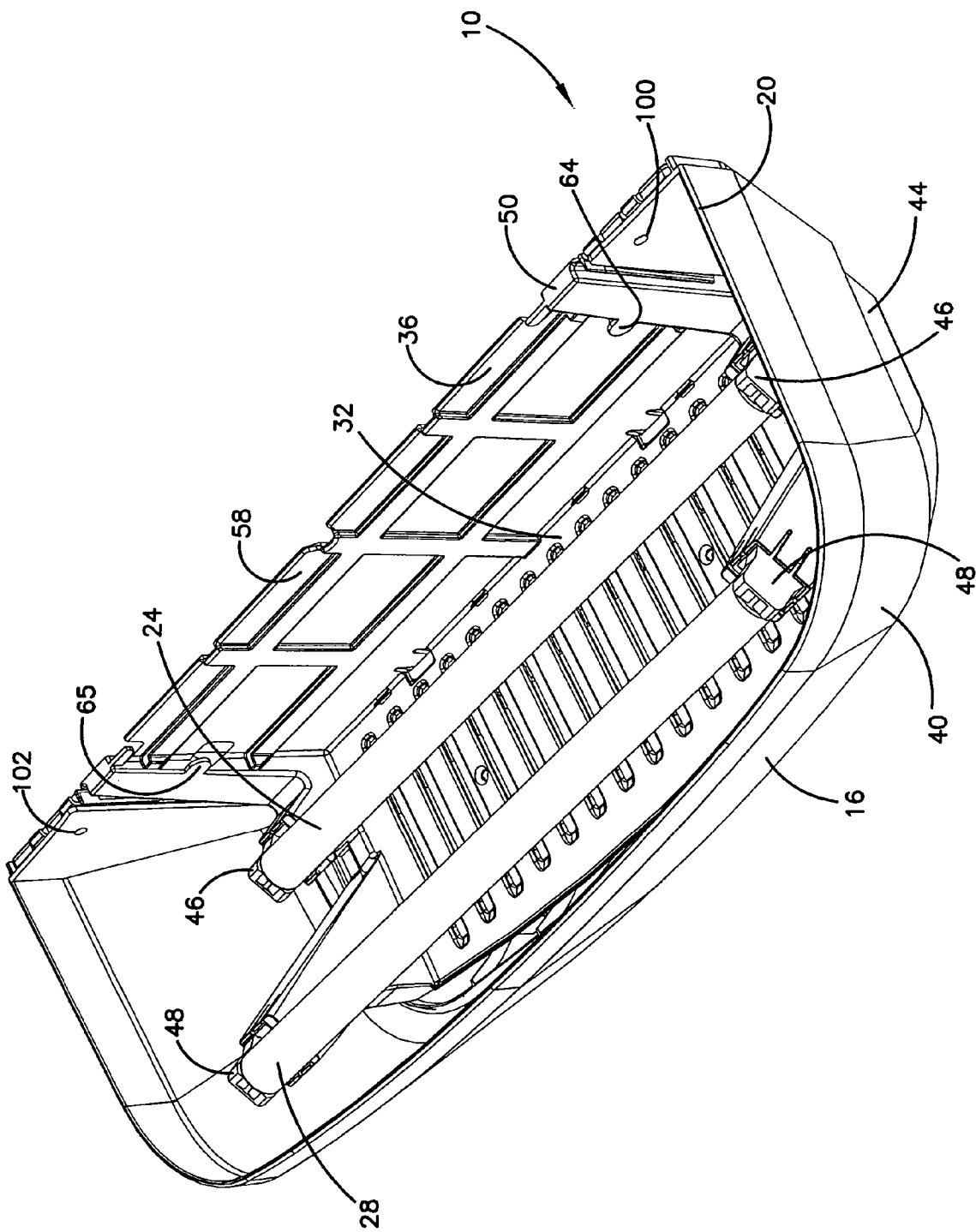
FIG. 2 is a top, right, front perspective view of the insect trap of FIG. 1.

FIG. 1 illustrates one particular embodiment in which an insect trap 10 is shown mounted on a vertical mounting surface 14. The insect trap described by the present invention is typically mounted on a vertical mounting surface at a height which is above the eye level of the occupants of the room where it is located. However, the trap may be mounted on horizontal surfaces or other surfaces in addition to vertical mounting surfaces. Throughout this description, the trap will be described in the example where it is mounted on a vertical mounting surface. The trap 10 includes a housing that defines an opening 20, which will be an upwardly facing opening when the trap 10 is mounted on a vertical mounting surface 14. FIG. 2 illustrates a top perspective view of the trap 10 where the upwardly facing opening 20 defined by the housing 16 is more easily observed. The trap also includes a source of insect attractant light, such as a first bulb 24 for producing ultraviolet light and a second light 28 for producing ultraviolet light. The trap surrounds and encloses the light source on all sides except the side where the upwardly facing opening 20 is located. A support structure 32 is also visible within the trap 10. The support structure 32 is capable of supporting an insect immobilization device (not shown in FIG. 2), such as an adhesive sheet that traps flying insects. The opening 20 allows insect attractant light to be emitted from the trap and allows for insect entry into the trap.

Figure 3:
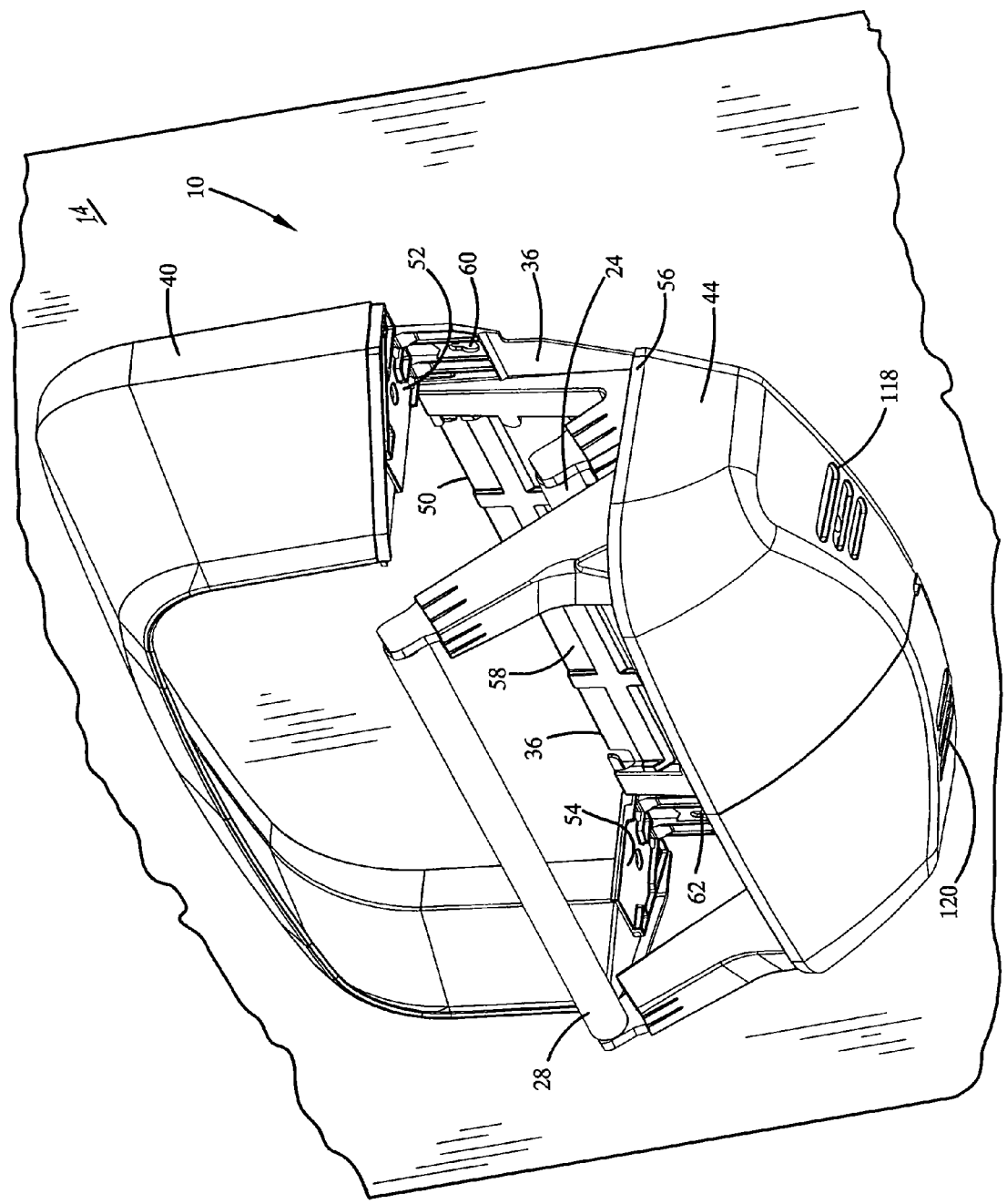
FIG. 3 is a bottom, front, right perspective view of the insect trap of FIG. 1, with the upper housing shown in the open position.

In one embodiment, the housing 16 includes three different components: a chassis 36, an upper housing 40, and a lower housing 44. The chassis 36 is configured to be mounted to a mounting surface to support the trap 10. The chassis includes bulb supports 46, 48 for supporting the light bulbs and defines the support structure 32 for supporting an insect immobilization device. At a top edge 50 of the chassis 36, the chassis is pivotally connected to the upper housing 40. This pivotal connection allows the upper housing 40 to be rotated into an open position as illustrated in FIG. 3. The rotation of the upper housing 40 into an open position allows a user of the insect trap to more easily access the immobilization device supported on the support structure 32 and more easily access the light bulbs 24, 28.

The lower housing 44 is removably attached to the chassis 36. The lower housing 44 includes an upper lip 56 that surrounds the support structure 32.

Figure 4:
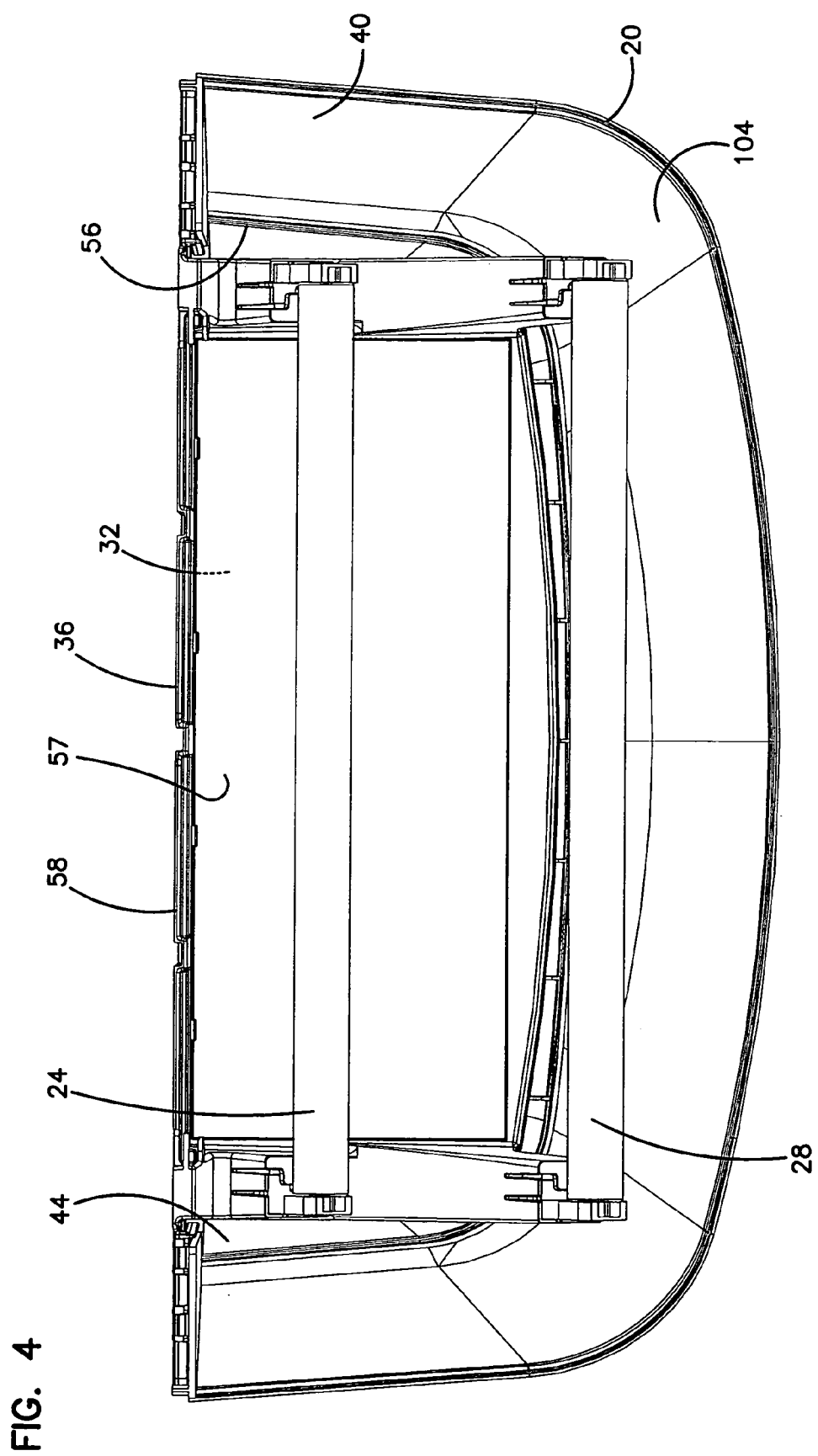
FIG. 4 is a top view of the insect trap of FIG. 1, with a glue board added to the support structure.

The pivotable upper housing 40 overlaps the upper lip 56 of the lower housing 44, as illustrated in FIG. 1. FIG. 4 shows a top view of the trap 10, where the upper lip 56 of the lower housing 44 surrounds the outer edge of the support structure 32. The configuration of the lower housing 44 surrounding the support structure 32 is configured to reduce the likelihood that dead insects will fall from the trap when the upper housing 40 is pivoted into the open position. If any deceased insects are contained within the trap 10 but are not attached to the immobilization device on support structure 32, then these insects will likely fall into the lower housing 44. This lower housing 44 is not moved or disturbed when the upper housing 40 is pivoted into the open position when the immobilization device is replaced. As a result, the process of changing the immobilization means in the trap 10 is more sanitary and less likely to require cleanup of the surrounding area.

The overlap between the upper lip 56 of the lower housing 44 and the upper housing 40 blocks light from exiting from this juncture between the upper housing 40 and the lower housing 44. This configuration ensures that it will not be possible for an insect attracting level of light emission to come from the juncture between the upper housing 40 and the lower housing 44.

FIG. 4 illustrates a glue board 57 positioned on the support structure 32. Generally, the glue board is placed upon the support structure 32 when the upper housing 40 is tilted into the open position. One side of the glue board 57 includes a highly tacky, pressure sensitive adhesive substance which is attached to a cardboard base. One useful adhesive is a latex-based, plasticized tacky acrylic, ethylene-vinyl acetate or vinyl acetate based adhesive containing UV-inhibitors made by the H.B. Fuller Company of St. Paul, Minn. Another useful adhesive is the Tangle trap adhesive made by the Tanglefoot Company. The glue board 57 is illustrated as being positioned below the light sources of the insect trap. However, the glue board 57 or other insect immobilization device could be positioned at any other place within the insect trap. For example, an immobilization device could be placed on a back wall 58 of the chassis positioned behind tabs 64, 65, an inner surface 104 of the upper housing 40 where tabs could be provided, or other places within the trap. In one embodiment, the trap is configured so that the insect immobilization device and the immobilized flying insects are not visible to people in the vicinity of the insect trap when the insect trap is in its normal, closed, operating position and mounted above eye-level. Typically, the insect trap is mounted at eye level or above on a vertical mounting surface 14 (FIG. 3). It is also possible to mount the trap on a ceiling or other mounting surface. For the purposes of this invention, the term "insect immobilization device" includes any device, surface or material that can cause an insect to die, or which prevents the insect from exiting the insect trap after entry. An insect immobilization device can include pesticides in the form of a surface, layer or trap; active and passive mechanical traps; liquid traps into which the flies become immersed; adhesive layers; pressure sensitive adhesive layers; high or low, DC or pulsed voltage electric grids; or other such means that can trap, immobilize, kill or dismember the insects.

The glue board 57 may be configured to aid in directing reflected light onto the mounting surface or out of the opening 20 above. The adhesive on the glue board 57 may have a shiny surface that reflects light from the light sources out of the opening 20. The board beneath the glue may be a dark color, such as black, or may be a lighter color. A lighter color glue board will provide additional reflection of light compared to a darker colored glue board. The glue board 57 may be located on a support structure 32 that is below the light sources 24, 28 as illustrated in FIG. 4. In an alterative embodiment, an insect immobilization device is provided along the back wall 58 of the chassis 36, held in place by tabs 64, 65. In another alterative embodiment, an insect immobilization device may be positioned on the interior surface 104 of the upper housing 40. Tabs (not shown) may be provided on the interior surface 104 of the upper housing 40 for supporting an insect immobilization device. In further alternative embodiments, a first insect immobilization device could be provided on the support surface 32 and a second insect immobilization device could be provided on the back wall of the chassis 58. In another alternative, insect immobilization devices could be provided on the support surface 32 and on the interior surface 104 of the upper housing 40. Alternatively, insect immobilization devices could be provided on the back wall 58 of the chassis 36 and on the interior surface 104 of the upper housing 40. In a still further embodiment, an insect immobilization device could be provided on the support structure 32, the back wall 58 of the chassis 36 and on the interior surface 104 of the upper housing 40. The glue board 57 could be pleated or have another structure to increase its surface area for capturing insects.

Figure 5:
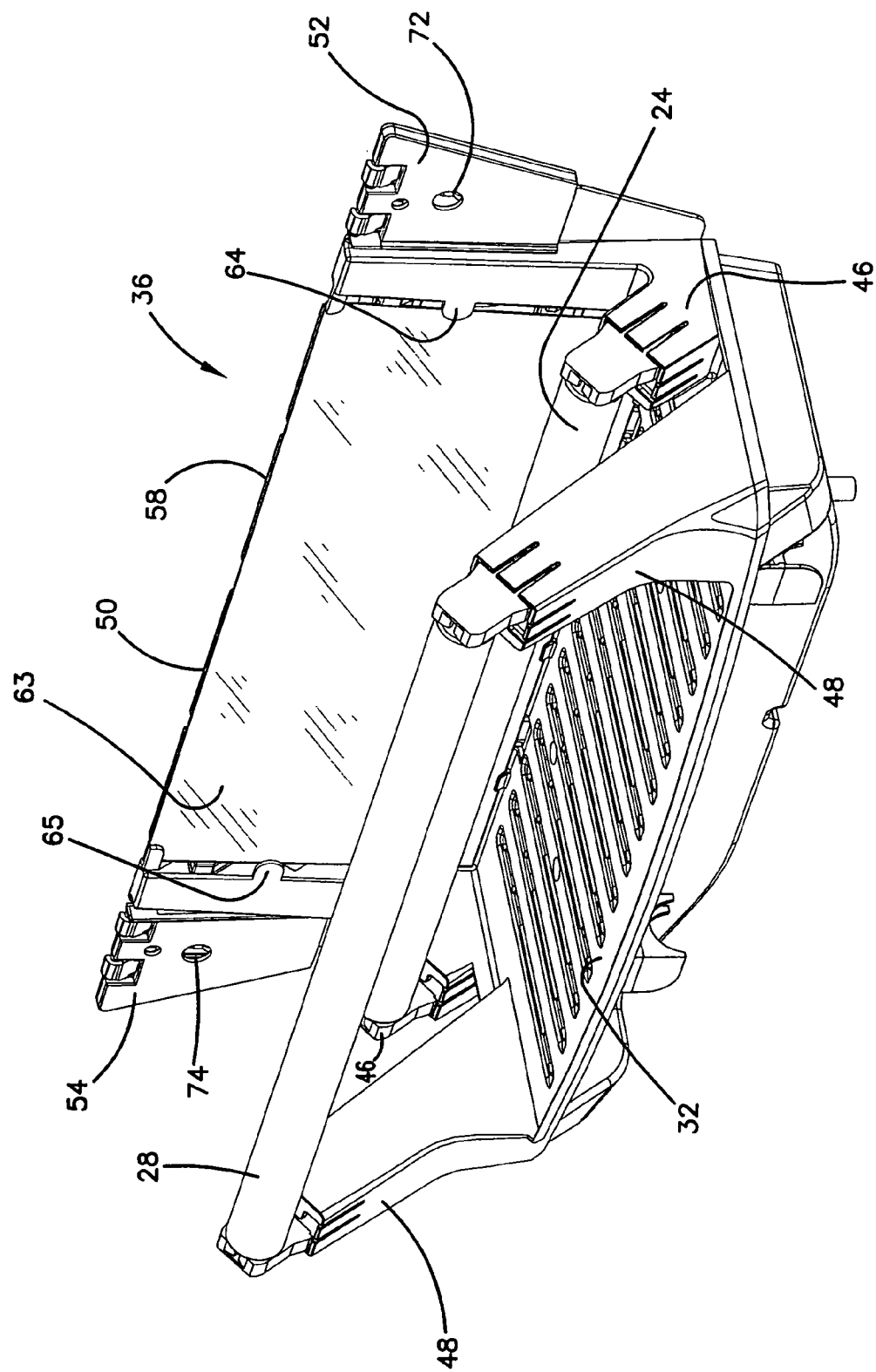
FIG. 5 is a front right perspective view of one embodiment of a chassis portion of an insect trap according to the present invention, where a reflective sheet is provided on the back wall of the chassis.

FIG. 5 shows the chassis 36 alone, with the upper housing 40 and lower housing 44 removed. The chassis 36 includes the support structure 32 for holding an insect immobilization device and light bulb supports 46, 48. The chassis 36 also includes a back wall 58 that abuts the mounting surface when the trap is mounted. The back wall 58 includes an upper edge 50. At opposite ends of the top edge 50, the chassis 36 includes hinges 52, 54 for allowing the pivotal attachment of the upper housing 40 to the chassis 36. FIG. 3 shows the hinges 52, 54 in the open position, revealing mounting openings 60, 62 in the back part of the hinges 52, 54. The mounting openings are used to secure the chassis 36 to a mounting surface 14 (FIG. 3). The hinges 52, 54 include openings 72, 74 for receiving attachment devices to secure the upper housing 40 to the chassis 36.

Any number of conventional fasteners such as screws, nails, bolts, or other devices may be used to attach the trap 10 to the mounting surface 14 (FIG. 3) via the mounting openings 60, 62 and to attach the upper housing 40 to the chassis via the openings 72, 74.

In FIG. 5, a reflective sheet 63 is shown positioned along the back wall 58 of the chassis 36. The reflective sheet 63 is held against the back wall 58 by tabs 64, 65. A glue board or other insect immobilization device may alternatively be positioned along back wall 58 using tabs 64, 65. The reflective sheet 63 may be included in one embodiment of the present invention in order to encourage the dispersal of reflected light into the area surrounding the insect trap.

Figure 6:
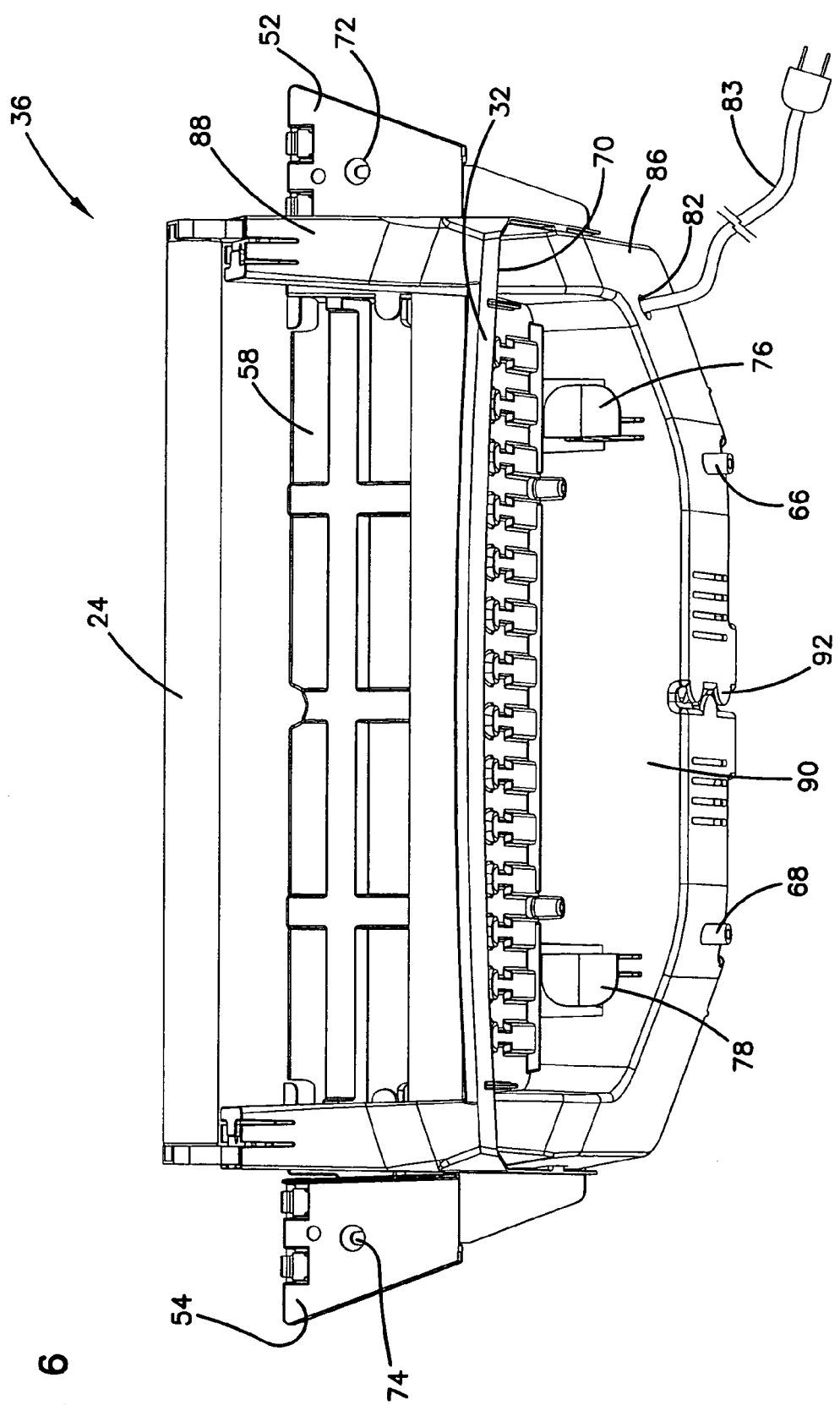
FIG. 6 is a front, bottom perspective view of the chassis of FIG. 5, without a reflective sheet, but including a power cord.

FIG. 6 illustrates a perspective front bottom view of the chassis 36 where the attachment mechanisms for the lower housing 44 are visible. Screw bosses 66, 68 on the bottom portion of the chassis 36 may receive screws to attach the lower housing to the chassis. In addition, to assist with the positioning of the lower housing 44, the support structure 32 includes a lip 70 that may interact with tabs on the lower housing, as will be discussed further herein.

The chassis further includes hooks 76, 78 for winding a power cord to a desired length. The power cord emerges from a power cord opening 82 in a lower portion of the chassis 36. The chassis 36 generally includes a lower portion 86 and an upper portion 88, where the support structure 32 roughly divides the lower portion 86 and the upper portion 88. In the lower portion 86 of the chassis 36, the electronics of the device may be encased behind wall 90. The power cord will typically emerge from the power cord opening 82, be wound around power cord hooks 76, 78 to a desired length, and then be positioned within a power cord holder 92 to emerge from the bottom of the device. The bottom of the chassis 36 may be provided with vents 93, 94 for allowing air flow from the area behind wall 90 where the electronics components are held. In place of a power cord, it is also possible that the insect trap is hard wired with an electrical supply or powered by batteries. The chassis 36 may enclose electrical components behind wall 90 such as a power cord connection, a lamp ballast if fluorescent bulbs are used, and electrical wiring that is connected to the light bulb supports 46, 48 (FIG. 5).

Figure 7:
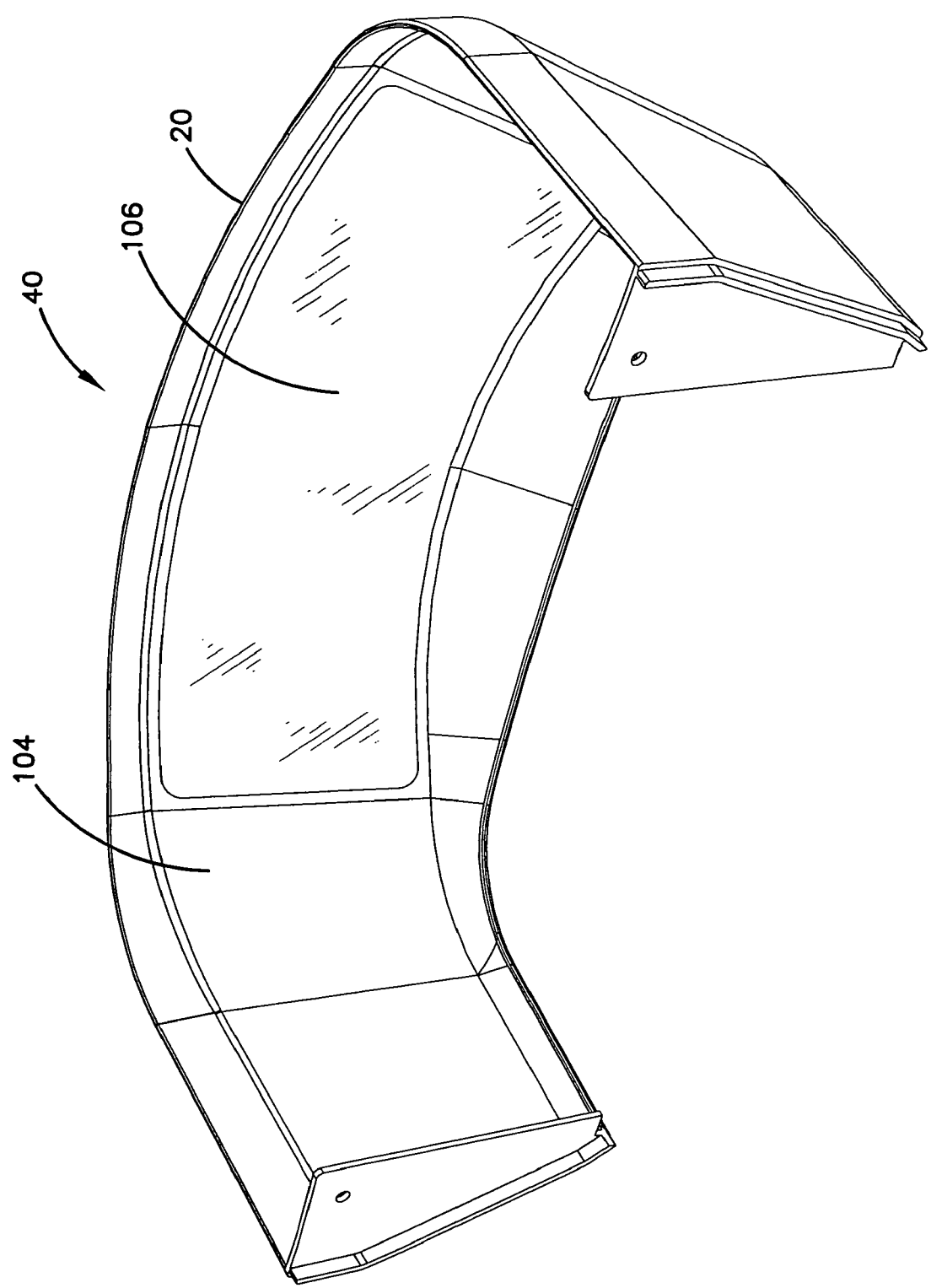
FIG. 7 is a back left perspective view of one embodiment of an upper housing of the present invention, including a reflective sheet portion.

FIG. 7 illustrates a back view of the upper housing 40. The upper housing 40 includes holes 100, 102 for securing the upper housing 40 to the openings 72, 74 on the hinges 52, 54 of the chassis 36 (FIG. 5). The upper housing also includes a reflective area 106 in one embodiment of the insect trap. The reflective area 106 may be a self-adhesive section of Mylar® material or other material for increasing the reflectivity of the inner surface of the upper housing 40 compared to the upper housing without a reflective area 106. The presence of a reflective area 106 increases the light that is directed at the mounting surface by reflecting light from the light sources toward the mounting surface. Even without a reflective area 106, the inner surface of the upper housing contributes to reflecting light from the light sources toward the mounting surface and into the area above the trap. The presence of a glue board on the interior surface 104 of the upper housing 40 may also increase the amount of reflected light from the upper housing 40.

The term "reflective area" or "reflective surface" can be any surface which reflects or throws back light. The reflective area 106 or the inner surface of the upper housing 40 are angled in one embodiment such that light from the light source is directed onto the mounting surface above the trap.

Figure 8:
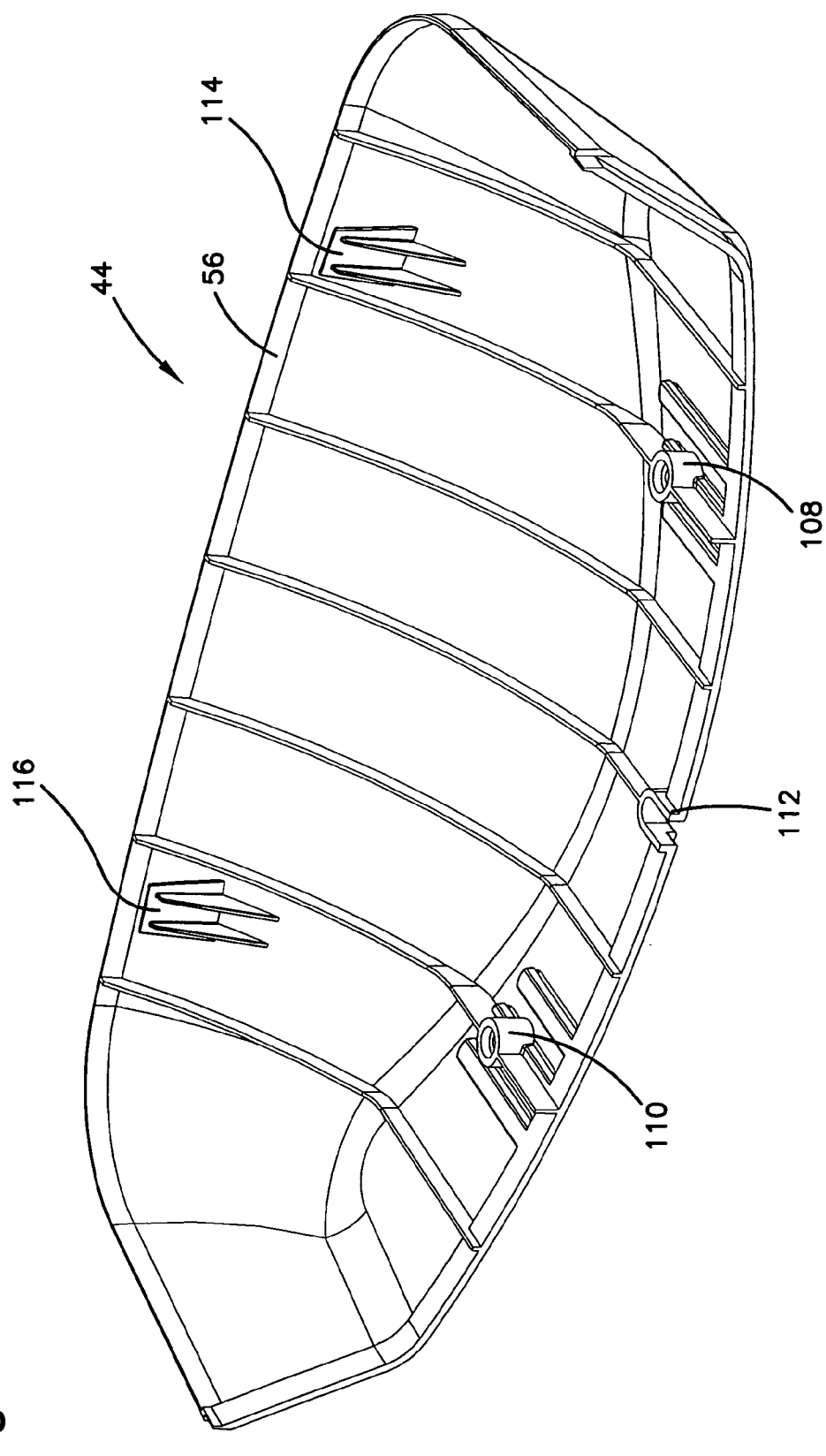
FIG. 8 is back, left, perspective view of one embodiment of a lower housing component of an insect trap of the present invention.
Figure 9:
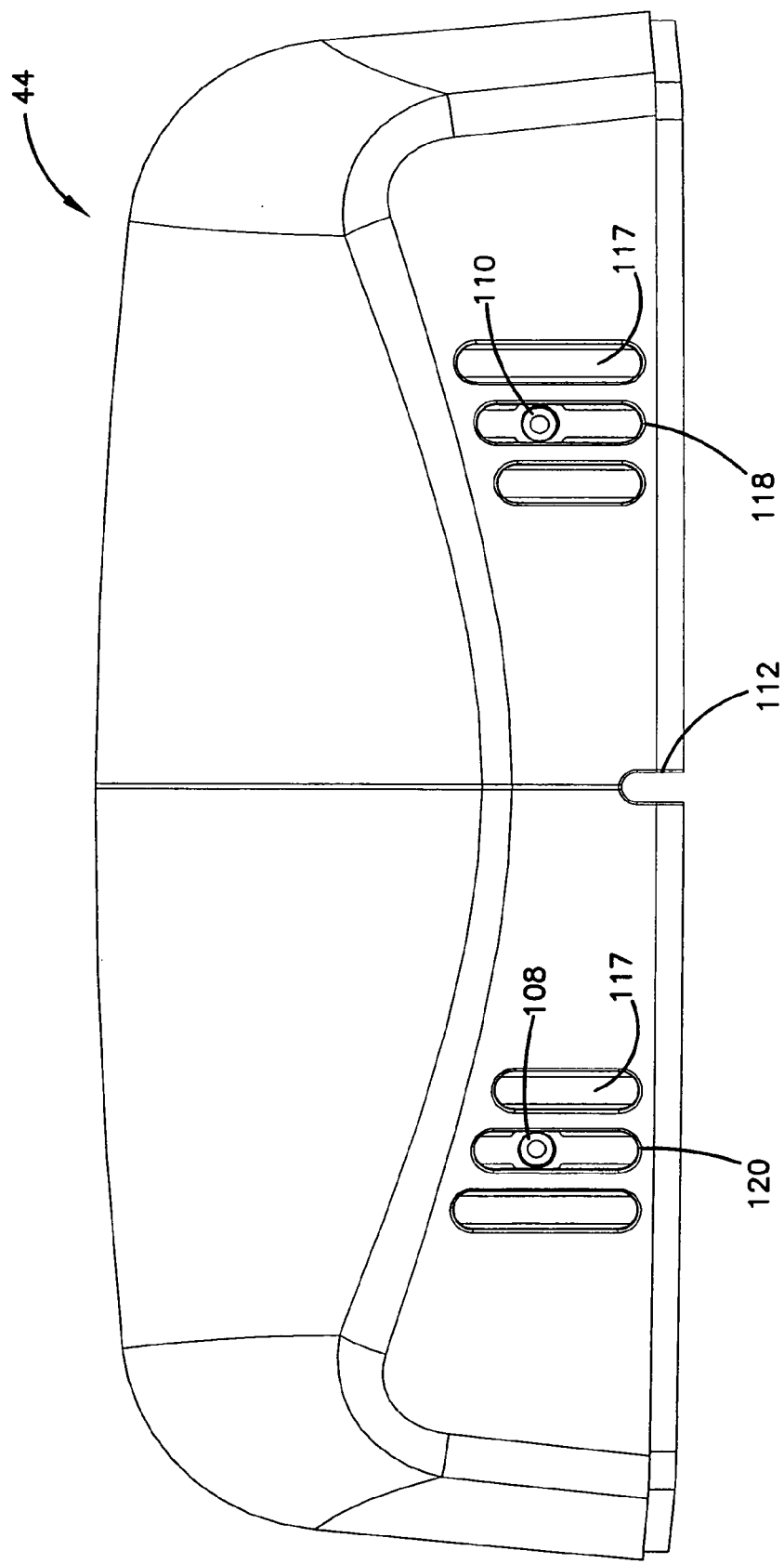
FIG. 9 is a bottom plan view of the lower housing of FIG. 8.

The lower housing 44 is further illustrated in FIGS. 8 and 9. The lower housing includes openings 108, 110 for attachment devices to attach the lower housing 44 to the chassis 36. The lower housing 44 also includes an upper lip 56 that will surround the support structure 32 when the lower housing 44 is attached to the chassis 36. The lower housing 44 further includes an opening 112 for the power cord to be accommodated. The lower housing 44 also includes tabs 114, 116 for interfacing with the lip 70 of the support structure 32 (FIG. 4). The tabs 114, 116 assist the user with guiding the lower housing 44 into the correct position with respect to the chassis 36.

Now referring to FIG. 9, the lower housing 44 also includes vent opening patterns 118, 120 to allow air flow to circulate within the lower housing so that heat from the electronics components is dissipated. Each vent opening within the vent opening patterns 118, 120 includes a baffle structure 117 which partially blocks the vent opening. In combination with the support structure 32, the baffle structure 117 prevents any appreciable amount of light from exiting from the vent opening patterns 118, 120. Accordingly the vent opening patterns 118, 120 do not allow light to escape and do not allow a level of light that would attract insects to this area. In addition, the baffle structure 117 leaves only a 1-2 mm wide opening, too small to allow entry for a typical housefly and many other flying insects.

Figure 10:
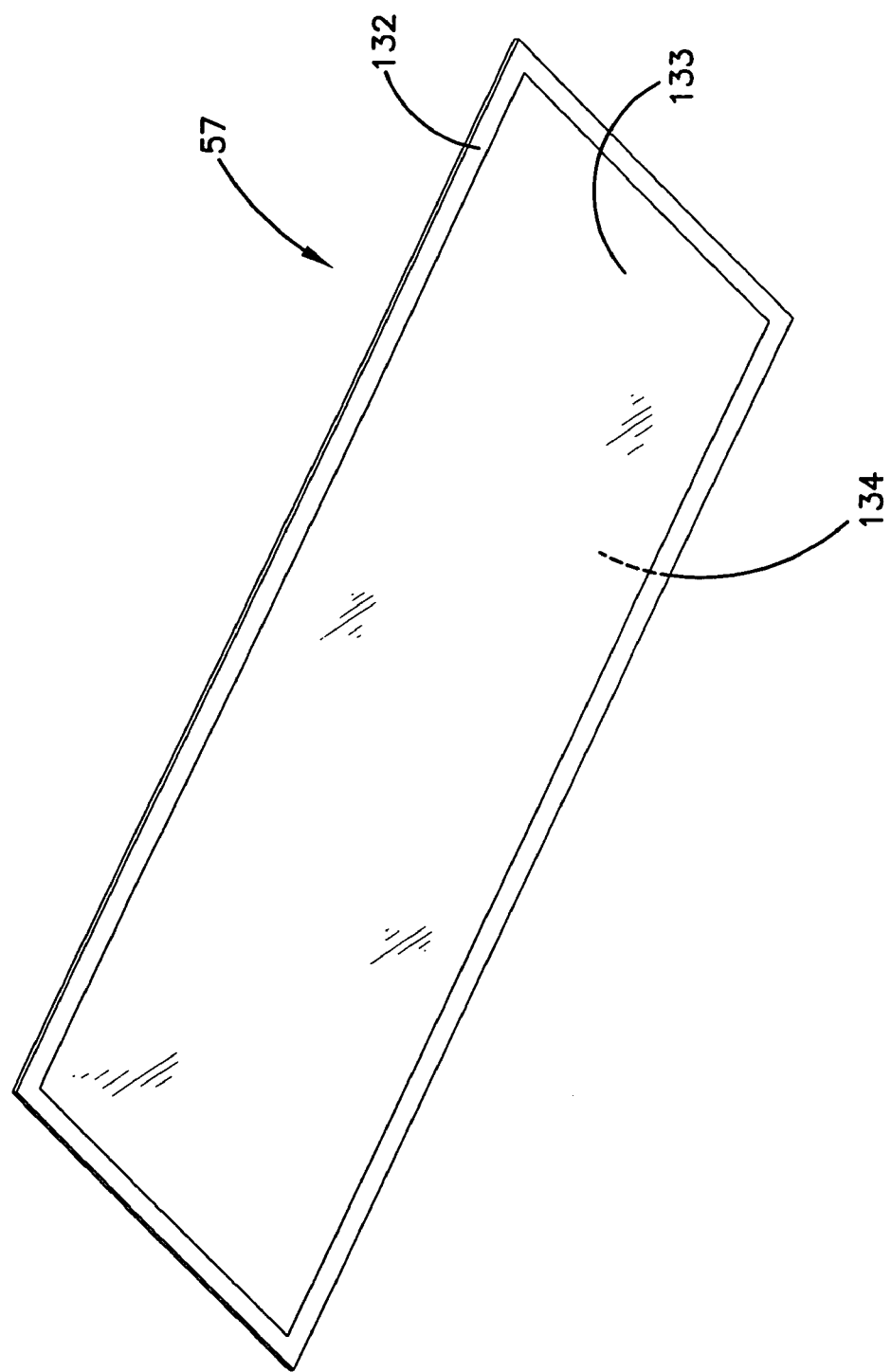
FIG. 10 is a perspective view of one embodiment of a glue board that may be used with the insect trap of the present invention.

FIG. 10 illustrates a glue board 57 which can be used as the insect immobilization device within the trap. The glue board includes an adhesive side 132 and a non-adhesive side 134 where the adhesive side is designed to trap flying insects that land upon it. The adhesive 133 on the adhesive side 132 of the glue board 57 may be shiny to increase the emission of light through the opening 20. The glue board 57 may be placed on the support structure 32, shown in FIG. 2. Other options for the insect immobilization device include a sheet coated with a substance that is lethal to the insects upon ingestion, electrocution means, or other insect immobilization devices known in the art.

The insect trap 10 of the present invention has been discussed as having three separate housing components: a chassis 36, and upper housing 40 and a lower housing 44. In another embodiment of the present invention, the housing consists of two separate housing components: an alternative chassis and an upper housing. In this embodiment, the alternative chassis includes a lip portion that surrounds the support structure within the alternative chassis, similar to the way that the lip 56 of the lower housing 44 surrounds the support structure 32 in the embodiment illustrated in the accompanying Figures. In this alterative embodiment, the upper housing extends downwardly to overlap with the lip of the chassis that surrounds the support structure. Such an embodiment could have the same appearance as trap 10 in FIGS. 1-4, where the lower housing 44 would be integrally formed with the chassis 36 to form the alternative chassis that includes the features of the chassis 36 described above.

The insect trap shown in FIGS. 1-9 includes two ultraviolet light sources for producing insect attracting light and an insect attracting light pattern on the mounting surface. However, it is also possible and contemplated to provide only one light source or to provide more than two light sources. In determining the position of the light source or sources, it is a goal to optimize the light pattern on the mounting surface 14 for maximum insect attractancy. In the embodiment illustrated in FIG. 5, the second light source 28 is positioned farther away from the back wall 58 than the first light source 24. This positioning is designed to decrease the ultraviolet radiation damage to the mounting surface by increasing the distance between the light source and the mounting surface. Other positions for two light sources are also possible, such as two light sources at the same height as the second light source 28, two light sources at the height of the first light source 24, or one or more light sources at an intermediate height.

The light source or light sources provided in the trap may be a source of ultraviolet light, such as common incandescent or fluorescent electrically driven light sources that can emit a broad spectrum of wavelengths, but are primarily optimized to emit ultraviolet light. For the purposes of this invention, ultraviolet light includes radiation having wavelengths that have been found to attract flying insect species, between about 4,000 Angstrom and about 400 Angstrom. The light sources commonly provide from about 0.5 to about 100 watts of light output, while preferably, the lights provide from about 0.5 to about 75 watts of light output. Preferred light sources are fluorescent bulbs having from about 1 to 40 watts per tube unit.

The housing of the insects trap can be manufactured in a variety of ways. Portions of the trap can be molded as a single piece from thermoplastic materials or can be assembled from flat or substantially planar components that are attached by common available fasteners to form the insect trap. In one embodiment, the chassis 36 includes the electrical components enclosed within a metal enclosure and surrounded by molded plastic parts to form the remainder of the chassis. The upper housing and lower housing may be single pieces constructed of molded plastic. The division of the upper and lower housing into separate pieces facilitates easier molding of these parts. In another embodiment, the chassis, upper housing and lower housing are made from molded plastic. The housing may be made from commonly available structural materials including thermoplastic such as polyethylene, polypropylene, polyethylene terephthalate, metallic materials such as aluminum, magnesium or related alloys, wood or wood products, reinforced thermoplastics or thermosetting materials, paper board, pressed paper board, corrugated paper board, and others.

The use of the insect trap will now be described with reference to FIGS. 2 and 3. After installing the chassis 36 on a mounting surface 14, the upper housing 40 is attached to the chassis 36 at the hinges 52, 54 through openings 72, 74. A glue board 130 (FIG. 10) is placed on the support structure 32 when the upper housing 40 is tilted into the open position, or before the upper housing 40 is attached to the chassis 36. Light bulbs 24, 28, may also be installed in the chassis before or after the upper housing 40 is attached. Now referring to FIG. 6, the power cord 83 may be adjusted to the appropriate emerging length by winding the excess power cord 83 around power cord hooks 76, 78, positioning the power cord 83 within the power cord opening 92, and connecting the power cord 83 to an outlet. Again referring to FIG. 3, the lower housing 44 is then attached to the chassis 36.

Periodically, the glue board or other insect immobilization device will need to be replaced as its surface area will eventually be blocked by trapped insects. The light bulbs 24, 28 will also need to be periodically replaced. In order to replace the glue board or light bulbs, the user tilts the upper housing 40 into the open position. The user then removes the old glue board from the support structure 32, and replaces a new glue board onto the support structure 32 and may replace the light bulbs 24, 28. Then the upper housing 40 is tilted back into place in the closed position, as shown in FIGS. 1 and 2. In one embodiment, the upper housing 40 and the hinges 52, 54 are configured so that the upper housing 40 will remain in the open position without being retained there once it is placed in the upper position.

The various embodiments described are provided by way of illustration only and should not be construed to limit the invention. Those skilled in the art will readily recognize various modifications and changes which may be made to the present invention without strictly following the exemplary embodiments and application illustrated and described herein and without departing from the true spirit and scope of the present invention which is set forth in the following claims.

We claim:

1. A flying insect trap comprising:
   (a) a first source of insect attractant light;
   (b) an insect immobilization device; and
   (c) a housing partially surrounding the source of insect attractant light, the housing defining an opening for insect attractant light emission and insect entry and defining a support structure for the insect immobilization device, the housing comprising:
      (i) a chassis configured to be attached to a mounting surface, the chassis supporting the source of insect attractant light and including an upper portion and a lower portion,
      (ii) an upper housing pivotally attached to the upper portion of the chassis and movable between a closed position and an open position, wherein the support structure for the insect immobilization device is accessible when the upper housing is in the open position,
      (iii) a lower housing that is removably attached to the lower portion of the chassis.

2. The insect trap of claim 1 wherein the trap is configured to form an insect attractant light pattern of reflected and radiated light on the mounting surface.

3. The insect trap of claim 1 wherein the support structure for the insect immobilization device is defined by the chassis and the lower housing comprises an upper lip that surrounds the support structure for the insect immobilization device.

4. The insect trap of claim 1 wherein the lower housing removably attaches to the chassis using screws.

5. The insect trap of claim 1 further comprising a second source of insect attractant light that is supported by the chassis.

6. The insect trap of claim 1 wherein the housing completely encloses the first source of insect attractant light on all sides except on a side where the opening is located.

7. The insect trap of claim 1 wherein the opening is an upwardly-facing opening when the trap is mounted on a vertical mounting surface.

8. The insect trap of claim 1 wherein the housing further comprises an internal reflecting surface on an interior surface.

9. The insect trap of claim 1 wherein the light source cannot be readily viewed when the housing is installed on a vertical mounting surface above eye level.

10. The insect trap of claim 1 wherein the insect immobilization device cannot be readily viewed when the housing is installed on a vertical mounting surface above eye level.

11. The insect trap of claim 1 wherein the insect immobilization device comprises adhesive.

12. The insect trap of claim 1 wherein the support structure for the insect immobilization device is positioned below the first source of insect attractant light.

13. The insect trap of claim 1 further comprising a second insect immobilization device positioned on a back wall of the chassis.

14. The insect trap of claim 1 wherein the support surface for the insect immobilization device is located on a back wall of the chassis.

15. The insect trap of claim 1 wherein the support surface for the insect immobilization device is located on an interior surface of the upper housing.

16. A flying insect trap comprising:
(a) a first source of insect attractant light;
(b) an insect immobilization device; and
(c) a housing partially surrounding the source of insect attractant light and defining an opening for insect attractant light emission and insect entry, the housing comprising:
  (i) a chassis configured to be attached to a mounting surface, the chassis supporting the source of insect attractant light and including a support structure for the insect immobilization device, an upper portion, and a lower portion,
  (ii) an upper housing pivotally attached to the upper portion of the chassis and movable between a closed position and an open position, wherein the support structure for the insect immobilization device is accessible when the upper housing is in the open position, and
  (iii) wherein the chassis comprises a lip that surrounds the support structure.

17. The insect trap of claim 16 wherein the support surface for the insect immobilization device is located on an interior surface of the upper housing.

18. A flying insect trap comprising:
(a) a first source of insect attractant light;
(b) an insect immobilization device; and
(a) a housing partially surrounding the source of insect attractant light and defining an upwardly facing opening for insect attractant light emission and insect entry, the housing comprising:
  (i) a chassis configured to be attached to a vertical mounting surface, the chassis supporting the source of insect attractant light and including a support structure for the insect immobilization device, an upper portion, and a lower portion,
  (ii) an upper housing pivotally attached to the upper portion of the chassis and movable between a closed position and an open position, wherein the support structure for the insect immobilization device is accessible when the upper housing is in the open position, and
  (iii) a lower housing that is removably attached to the lower portion of the chassis, wherein the lower housing comprises an upper lip that surrounds the support structure for the insect immobilization device.

\* \* \* \* \*